(12) United States Patent
Noda et al.

(10) Patent No.: US 7,235,331 B2
(45) Date of Patent: *Jun. 26, 2007

(54) SEMI-INTERPENETRATING POLYMER NETWORK ELECTROLYTE, PROCESS FOR PRODUCING THE SAME AND BATTERY USING THE SAME

(75) Inventors: Kazuhiro Noda, Kanagawa (JP); Takeshi Horie, Kanagawa (JP); Koji Sekai, Kanagawa (JP); Shinichiro Yamada, Kanagawa (JP)

(73) Assignee: Sony Corporation, Tokyo (JP)

( * ) Notice: Subject to any disclaimer, the term of this patent is extended or adjusted under 35 U.S.C. 154(b) by 479 days.

This patent is subject to a terminal disclaimer.

(21) Appl. No.: 10/256,573

(22) Filed: Sep. 27, 2002

(65) Prior Publication Data

US 2003/0054257 A1    Mar. 20, 2003

(51) Int. Cl.
*H01M 6/14* (2006.01)
*H01M 6/18* (2006.01)

(52) U.S. Cl. ............... 429/300; 429/302; 429/303; 429/304; 429/306; 429/309; 429/313; 429/317; 429/321; 429/323

(58) Field of Classification Search ............ 429/300, 429/302, 303, 304, 306, 309, 313, 317, 321, 429/323

See application file for complete search history.

(56) References Cited

U.S. PATENT DOCUMENTS

| | | | | |
|---|---|---|---|---|
| 5,112,512 A | * | 5/1992 | Nakamura | 252/62.2 |
| 5,419,984 A | * | 5/1995 | Chaloner-Gill et al. | 429/313 |
| 6,013,393 A | * | 1/2000 | Taniuchi et al. | 429/303 |
| 6,124,062 A | * | 9/2000 | Horie et al. | 429/324 |
| 6,469,107 B1 | * | 10/2002 | Sato | 525/404 |
| 6,573,009 B1 | * | 6/2003 | Noda et al. | 429/313 |
| 2002/0102464 A1 | * | 8/2002 | Yoshida et al. | 429/300 |

* cited by examiner

*Primary Examiner*—Patrick Joseph Ryan
*Assistant Examiner*—Angela J Martin
(74) *Attorney, Agent, or Firm*—Sonnenschein Nath & Rosenthal LLP

(57) ABSTRACT

An electrolyte with high ion conductivity, a process for producing the same and a battery using the same, and a compound for the electrolyte. The electrolyte is set between a negative electrode and a positive electrode. The electrolyte includes a first polymer compound, a second polymer compound and light metal salt. The first polymer compound has a three-dimensional network structure formed by bridging bridgeable compounds with the bridge groups, which contributes to the high mechanical intensity of the electrolyte. The second polymer compound has no bridge groups and dissolves light metal salt. Each of the first and the second polymer compounds has an ether bond. The first and the second polymer compounds form a semi-interpenetrating polymer network, and achieve higher ion conductivity than that of each polymer compound.

26 Claims, 1 Drawing Sheet

SEMI-INTERPENETRATING POLYMER NETWORK ELECTROLYTE, PROCESS FOR PRODUCING THE SAME AND BATTERY USING THE SAME

BACKGROUND OF THE INVENTION

1. Field of the Invention

This invention relates to an electrolyte containing a polymer compound and light metal salt, a process for producing the same and a battery using the same, and a electrolyte compound.

2. Description of the Related Art

Recently, portable electric products, such as a camcorder (video tape recorder), a cellular phone, and a laptop computer, are spreading quickly. Such electric products require even higher performance of their electrochemistry devices.

Conventionally, in electrochemistry devices such as a secondary battery, liquid electrolyte solution, such as water and organic solvent, have been used as electrolyte to control ion conduction. However, since a liquid electrolyte has problems such as leaking, it is necessary to secure liquid-tightness by using a metal container. Therefore, an electrochemistry device generally becomes heavier and has the less versatility of possible form features. Furthermore, the sealing process is usually complicated. In contrast, the so-called solid electrolyte which consists of an solid state electrolyte has no liquid leak. The solid electrolyte has several other advantages, that is, simplified sealing process, lighter device, and the flexibility of the form selection due to the excellent ability of polymer to be molded into films. Therefore, a lot of researches have been made on the solid electrolyte.

Generally this solid electrolyte consists of a matrix polymer and electrolyte salt from which ion can be dissociated. The matrix polymer has ion dissociation power and has two functions: keeping this ion conductive solid in solid state and behaving as a solvent for electrolyte salt. Armand et al. of the Grenoble University (France) made a report on an example of the solid electrolytes in 1978; they achieved the ion conductivity of the order of $1 \times 10^{-7}$ S/cm in a system where lithium perchlorate was dissolved in polyethylene oxide. Since then, a variety of polymer materials are still examined actively, especially a polymer with a polyether structure.

The solid electrolyte such as the polyethylene oxide uses a linear polyether as a matrix. This type of solid electrolyte achieves its ion conductivity by transferring the dissociated ions in the amorphous phase at the temperature above the glass transition point of the matrix polymer using the local segment movement of a polymer chain.

However, the ions dissociated into the linear matrix of a polyethylene oxide which has partially crystalline phase, especially cations are strongly coordinated by the interaction with the polymer chain, and becomes a pseudo-bridge point. This causes partial crystallization, which reduces the segment movement. In order to increase ion conductivity under room temperature, it is necessary to increase the ion dissociation power of the electrolyte salt and to develop a desirable molecular design for the polymer so that the polymer has many amorphous domains where the ions can move easily within a matrix, and the glass transition point of the polymer is kept lower.

In one molecular design, a branch structure is introduced into the polyethylene oxide frame in an attempt to increase ion conductivity (Masayoshi Watanabe, Netsu Sokutei 24 (1) pp 12–21, 1996). However, the synthesis of this type of polymer requires a complicated process.

In another molecular design, a three-dimensional network is introduced into a matrix polymer in an attempt to prevent the crystallization of polymer. This molecular design is applied to, for example, a polymer obtained by polymerizing the acrylic or methacrylic system monomer with a polyoxyalkylene component, as disclosed in Japanese Non-examined Patent Publication No. 5-25353. However, since alkali metal salt is not dissolved in a monomer very well, sufficient ion conductivity can not be achieved. Therefore, it is necessary to obtain an alternative solid electrolyte.

SUMMARY OF THE INVENTION

This invention has been made in view of such problems. An object of the present invention is to provide an electrolyte with higher ion conductivity, a process for producing the same, and a battery using the same, and a compound for the electrolyte.

An electrolyte compound according to the present invention includes two or more sorts of polymer compounds which form a semi-interpenetrating polymer network.

Another electrolyte compound according to the present invention includes bridgeable compounds having bridgeable functional groups, and a second polymer compound, wherein the second polymer compound and a first polymer compound obtained by bridging the bridgeable compounds with the bridge groups can form a semi-interpenetrating polymer network.

An electrolyte according to the present invention includes two or more sorts of polymer compounds which form a semi-interpenetrating polymer network, and light metal salt.

A process for producing the electrolyte includes steps of: mixing bridgeable compounds having bridgeable functional groups, a second polymer compound, and light metal salt; and forming a first polymer compound by polymerizing the bridgeable compounds having bridgeable functional groups, wherein the second polymer compound and the first polymer compound obtained by bridging the bridgeable compounds with the bridge groups form a semi-interpenetrating polymer network.

A process for producing an electrolyte according to the present invention includes steps of: mixing bridgeable compounds having bridgeable functional groups and a second polymer compound; forming a first polymer compound by polymerizing the bridgeable compounds having bridgeable functional groups; and adding light metal salt to the mixture containing the first and the second polymer compounds, wherein the second polymer compound and the first polymer compound obtained by bridging the bridgeable compounds with the bridge groups form a semi-interpenetrating polymer network.

A battery according to the present invention includes a positive electrode, a negative electrode, and an electrolyte including two or more sorts of polymer compounds which form a semi-interpenetrating polymer network.

An electrolyte compound according to the present invention includes two or more sorts of polymer compounds which form a semi-interpenetrating polymer network. Therefore, an electrolyte with high ion electric conductivity can be obtained.

Another electrolyte compound according to the present invention includes bridgeable compounds having bridgeable functional groups, and a second polymer compound, wherein the second polymer compound and a first polymer compound obtained by bridging the bridgeable compounds with the bridge groups can form a semi-interpenetrating polymer network. Therefore, an electrolyte with higher ion electric conductivity can be obtained.

In the electrolyte according to the present invention, two or more sorts of polymer compounds form a semi-interpenetrating polymer network, and light metal salt exists in the network. Therefore, the polymer compounds achieve higher ion conductivity than the ion conductivity achieved by using each polymer compound separately.

In a process for producing an electrolyte according to the present invention, bridgeable compounds having bridgeable functional groups, the second polymer compound and light metal salt are mixed and, then, the bridgeable compounds are polymerized to form a first polymer compound.

In another process for producing an electrolyte according to the present invention, bridgeable compounds having bridgeable functional groups and the second polymer compound are mixed and, then, the bridgeable compounds are polymerized to form a first polymer compound. Then, light metal salt is added to the mixture.

The battery according to the present invention achieves the electromotive power by moving light metal ions from a negative electrode to a positive electrode. The electrolyte has a semi-interpenetrating polymer network formed by two or more sorts of polymer compounds so that the electrolyte achieves higher ion conductivity than the ion electric conductivity achieved by using polymer compound separately.

Other and further objects, features and advantages of the invention will appear more fully from the following description.

DETAILED DESCRIPTION OF THE PREFERRED EMBODIMENTS

Figure 1:
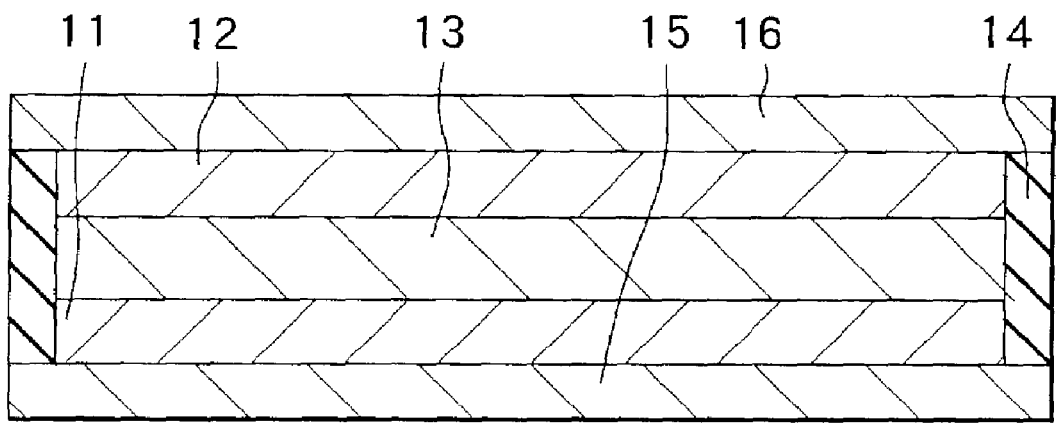
FIG. 1 is a sectional view showing the composition of the secondary battery using an electrolyte according to one embodiment of the present invention.

The embodiments of this invention will be described in further detail hereinafter.

An electrolyte according to one embodiment of this invention contains two or more sorts of polymer compounds which form semi-IPN (interpenetrating polymer network), and light metal salt. Preferably, at least one sort of the polymer compounds are a first polymer compound obtained by bridging a plurality of compounds with bridge groups, while at least one sort of other polymer compounds are a second polymer compound without bridgeable functional groups. Light metal salt is dissolved in the second polymer compound. The second polymer compound is compatible with the basic frame of the three-dimensional network structure formed by the first polymer compound.

The bridging in the first polymer compound increases the mechanical intensity of the first polymer compound. The bridging also suppresses the molecular movement so that the mobility of the dissociated ions becomes smaller. Thus, in general, the first polymer compound has high mechanical intensity and low ion conductivity. In contrast, the second polymer compound, which has no bridging, has low mechanical intensity and high ion conductivity, since the amount of the movement of a molecule is large and the glass transition point of the second polymer compound is low. In the electrolyte according to the embodiment of the present invention, the first and the second polymer compounds form a semi-interpenetrating polymer network. Therefore, the electrolyte according to the embodiment of the present invention is able to take full advantage of both the high mechanical intensity of the first polymer compound and the high ion conductivity of the second polymer compound.

In the semi-interpenetrating polymer network, substantially no chemical bond has arisen between the first and the second polymer compounds so that the molecular movement of the second polymer compound is not suppressed. Furthermore, as a synergistic effect of the first and the second polymer compounds which form the semi-interpenetrating polymer network, the crystallization of the second polymer compound is prevented. Thus the electrolyte according to the embodiment of the present invention achieves higher ion conductivity than the ion conductivity achieved by using either the first or the second polymer compound separately, in the wide range of the temperature. On the other hand, the three-dimensional network structure of the first polymer compound contributes to the high mechanical intensity of the electrolyte according to the embodiment of the present invention.

Preferably, each of the first and the second polymer compounds has at least one ether bond especially, a polyoxyalkylene structure, for example. This is for raising the compatibility of the polymer compounds, as well as dissolving light metal salt.

The first polymer compound may have a structure where linear open-chain compounds are bridged with the bridge groups or a structure where comb-like open-chain compounds are bridged with the bridge groups. Both types of compounds may have side chains. When using the compound where linear open-chain compounds are bridged, two possible structures are as follows: a structure where open-chain compounds having bridge groups at both ends are bridged with the bridge groups, and a structure where open-chain compounds having a bridge group at one end are bridged with the bridge groups.

In order to realize even higher ion conductivity, it is desirable that the first polymer compound have an open-end side chain containing an ether bond, such as a branch structure of polyoxyalkylene. Therefore, when using the compound where linear open-chain compounds are bridged as the first polymer compound, it is desirable that the compound have both of the two structures described above. This is for introducing the branch structure of polyoxyalkylene formed by open-chain compounds having a bridge group at one end into the three-dimensional network structure formed by open-chain compounds having bridge groups at both ends so that open-end side chains are formed.

Any bond including an ether bond, an ester bond and a urethane bond can be used to form the bridge structure of the first polymer compound. A suitable bond may be selected depending on the application.

Example of the first polymer compound described above are compounds having a structure where diester compounds are bridged with the bridge groups. The diester compounds correspond to the general formula shown in Chemical Formula (1):

(1)

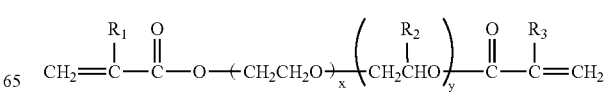

wherein $R_1$, $R_2$ and $R_3$ are a hydrogen atom or an alkyl of carbon numbers 1–6, and where $x \geq 1$ and $y \geq 0$, or $x \geq 0$ and $y \geq 1$. $R_1$, $R_2$ and $R_3$ may be: (i) all the same, (ii) different from one another, or (iii) one of the three is different from the other two.

As mentioned above, it is more desirable that the compounds having the structure where diester compounds corresponding to the general formula shown in Chemical Formula (1) are bridged with the bridge groups further have a structure where monochrome ester compounds are bridged with the bridge groups. The monochrome ester compounds correspond to the general formula shown in Chemical Formula (2):

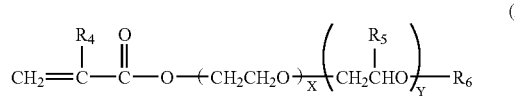
(2)

wherein $R_4$, $R_5$ and $R_6$ are a hydrogen atom or an alkyl of carbon numbers 1–6, and where $X \geq 1$ and $Y \geq 0$, or $X \geq 0$ and $Y \geq 1$. $R_4$, $R_4$ and $R_6$ may be: (i) all the same, (ii) different from one another, or (iii) one of the three is different from the other two.

In this case, it is desirable that a monochrome ester compound to diester compound ratio be within the range of more than 0 to 5.0 but not 0. The reason is as follows: if the structure where diester compounds are bridged with the bridge groups is formed in few positions in the first polymer compound, the three-dimensional network structure cannot be constructed; in contrast, if the structure where monochrome ester compounds are bridged with the bridge groups is formed in few positions in the first polymer compound, few open-end side chains are formed so that ion conductivity cannot be increased.

Example of the second polymer compound is an open-chain siloxane derivative which has an open-chain bond between silicon (Si) and oxygen (O) as a basic frame, and correspond to the formula $(SiOCH_3 R)_n$ wherein the side chain R is added to the silicon. In this case, it is preferable that substitution group or side chain group R be the monovalent organic group. It is also preferable that an ether bond be included. Examples of side chain group R are alkoxy, such as a ethoxy, a propoxy, a butoxy, and a methoxy group. It is desirable that the average molecular weight of this siloxane derivative is 100,000 or less. Hydrogen in the side chain group R may be replaced by halogen elements, e.g. boron or fluorine.

Preferably, the siloxane derivative specifically corresponds to the general formulae shown in Chemical Formula (3):

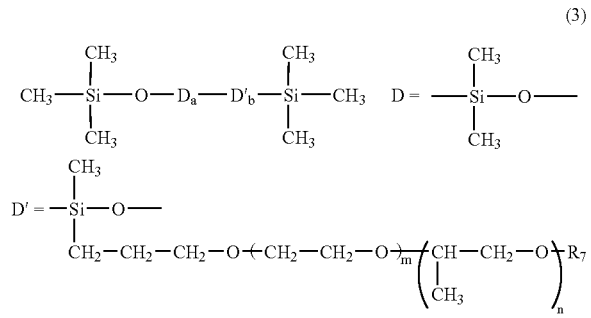
(3)

wherein a is an integer of 0 to 100, b is an integer of 1 to 100, m is an integer of 0 to 100, n is an integer of 0 to 100, and $R_7$ is a hydrogen atom or an alkyl. If b>1, D' may be: (i) all the same, (ii) different from one another, or (iii) some of D' are the same. The hydrogen atom contained in D' and R7 may be replaced by a halogen atom.

Light metal salt is for giving ion conductivity by dissociation, and corresponds to the general formula shown in Chemical Formula (4).

AB     (4)

wherein A is a light metal cation, and B is an anion.

Among the light metal salt are alkali metal salt e.g. lithium (Li) salt, sodium (Na) salt, and potassium (K) salt, alkali ground metal salt e.g. calcium (calcium) salt and magnesium (Mg) salt. Salt of any one sort of light metal cation A is selected. A plurality of salt with the same light metal cation A may be mixed in use. For example, among lithium salt are $LiClO_4$, $LiBF_4$, $LiPF_6$, $LiAsF_6$, $LiAlCl_4$, $LiSbF_6$, $LiCF_3 SO_3$, $LiN (CF_3SO_2)_2$, $LiC_4 F_9 SO_3$, $LiCF_3 CO_2$, $LiN (CF_3CO_2)$, $NaClO_4$, $NaBF_4$, NaSCN, or $KBF_4$; any one sort, or two or more sorts thereof are mixed in use.

When a siloxane derivative is used as the second polymer compound, preferably, 10 to 1000 parts by weight of the first polymer compound and 5 to 1000 parts by weight of the light metal salt are used for 100 parts by weight of the siloxane derivative. If the first polymer compound is less than 10 parts by weight, sufficient film strength cannot be obtained. If the first polymer compound is more than 1000 parts by weight, the film can be fragile. On the other hand, if the light metal salt is less than 5 parts by weight, sufficient ion conductivity cannot be achieved. If the light metal salt is more than 1000 parts by weight, the light metal salt cannot be dissolved fully or the film becomes so hard that ion conductivity deteriorates. However, these conditions may vary depending on the molecular weight of the siloxane derivative or the application of the electrolyte.

The electrolyte with the structure described above can be produced as follows, using the following compounds for the electrolyte.

Firstly, in order to prepare the compound for the electrolyte, bridgeable compounds having bridgeable functional groups, the second polymer compound and light metal salt are used. The second polymer compound and the first polymer compound obtained by bridging the bridgeable compounds with the bridge groups can form a semi-interpenetrating polymer network in order to achieve higher ion conductivity than the ion conductivity achieved by using either the first or the second polymer compound separately.

The examples of the second polymer compound and light metal salt are, as described above, a siloxane derivative and at least one sort of lithium salt respectively. The first polymer compound mentioned above is formed by bridging the bridgeable compounds. The bridgeable compounds may be a linear open-chain compound or a comb-like open-chain compound. The bridgeable compounds also may have side chains. The linear open-chain compound may have bridgeable functional groups at both ends or at one end. Furthermore, the bridgeable compounds may be multifunctional compounds that have three or more functions. In addition, the bridgeable compounds may consist of one kind of compound or a plurality of compounds.

Among the bridgeable compounds are the diester compound corresponding to the general formula shown in Chemical Formula (1). Preferably, the bridgeable compounds include the monochrome ester compound corresponding to the general formula shown in Chemical Formula (2) in addition to the diester compound corresponding to the general formula shown in Chemical Formula (1). This is for forming an open-end side chain when the bridgeable compounds are bridged. In this case, it is desirable that the monochrome ester compound to diester compound ratio be within the range of 0 to 5.0 but not 0.

Further, when a siloxane derivative is used as the second polymer compound, it is desirable that 10 to 1000 parts by weight of the bridgeable compounds and 5 to 1000 parts by weight of the light metal salt be used for 100 parts by weight of the siloxane derivative.

Then, the bridgeable compounds that has the functional groups, the second polymer compound, and a light metal are mixed to become a uniform mixture. A polymerization initiator is also added if needed. This polymerization initiator is needed except when the polymerization is performed by the irradiation of an electron ray. Examples include an optical polymerization initiator and a heat polymerization initiator.

Among optical polymerization initiators are acetophenone, trichloroacetophenone, 2-hydroxy-2-methyl propiophenone, 2-hydroxy-2-methyl isopropiophenone, 1-hydroxycyclohexyl ketone, benzoisoether, 2, 2-diethoxyacetophenone and benzyldimethylketal. Among heat polymerization initiators are high-temperature polymerization initiators and such as cumene hydroperoxide, tert-butyl peroxide, dicumyl peroxide and di-tert-butyl peroxide, initiators such as benzoyl peroxide, lauroyl peroxide, persulfate and azobisisobutyronitrile, and a redox initiator. One sort, or two or more sorts of these polymerization initiators may be mixed in use.

0.1 to 1.0 part by weight of a polymerization initiator is added to 100 parts by weight of the bridgeable compound. If the polymerization initiator is less than 0.1 part by weight, the polymerization speed falls remarkably. On the other hand, if more than 1.0 part by weight of the polymerization initiator is added, no change in effect is observed.

Then, an ultraviolet ray, an electron ray, X-rays, a gamma ray, microwave, or a high-frequency discharge is irradiated at the mixture, or alternatively the mixture is heated. Thus the bridgeable compounds are polymerized and the first polymer compound is formed. Furthermore, the first and the second polymer compounds form a semi-interpenetrating polymer network in which light metal salt exists. Thereby the electrolyte according to this embodiment is prepared.

When mixing the bridgeable compounds having the bridgeable functional groups, the second polymer compound, and light metal salt, proper organic solvents, such as acetonitrile, may be used to form a mixture. In this case, the organic solvent may be removed after polymerizing the bridgeable compounds and drying the polymerized bridgeable compounds by leaving or heating them in the air or under a reduced pressure. Alternatively, the bridgeable compound may be polymerized after drying the mixture and removing the organic solvent.

This electrolyte also can be prepared as follows.

Bridgeable compounds having bridgeable functional groups, the second polymer compound and light metal salt are used as in the previous production process. The bridgeable compounds having the bridgeable functional groups, and the second polymer compound are mixed. A polymerization initiator is added as in the previous preparing process if needed. Then, the bridgeable compounds are polymerized as in the previous preparing process, and the mixture of the first polymer compound and the second polymer compound is obtained. After that, light metal salt is dissolved in the organic solvent and penetrated into the mixture. Then the organic solvent is dried and removed. Thereby, the electrolyte according to this embodiment is obtained.

The conditions of the polymerization reaction in each of the above-mentioned production process are not limited. However, the polymerization reaction by the ultraviolet ray irradiation or the heating polymerization is desirable in view of the simple equipment and a low cost. When producing an electrolyte used for a lithium battery using alkali metal ion, a lithium ion battery, and a sodium battery, preferably, the compound for the electrolyte (namely, the bridgeable compounds, the second polymer compound and alkali metal salt), the solvent and the polymerization initiator for mixing these compounds for the electrolyte are fully dehydrated, and the atmosphere during the production is kept in low humidity. This is because some kinds of alkali metal salt is decomposed by reacting with moisture, and because alkali metal and moisture react intensely in the negative electrode when used in a battery.

The electrolyte prepared in this way is used for a battery as follows. An example of the secondary battery using lithium is given and explained below with reference to a drawing.

FIG. 1 shows the cross-sectional structure of the secondary battery using the electrolyte according to this embodiment. The battery shown in FIG. 1 is a paper type. In the secondary battery, negative electrode 11 and the positive electrode 12 are laminated with the electrolyte 13 according to this embodiment in between. Insulating packing 14 is placed on the side faces of the negative electrode 11, the positive electrode 12, and the electrolyte 13. The negative electrode 11, the positive electrode 12 and the electrolyte 13 are sealed by pasting the insulating packing 14 onto the circumferential edges of a pair of coating materials 15 and 16 which are placed to sandwich the negative electrode 11 and the positive electrode 12 in between.

The negative electrode 11 contains metal or carbon materials that can occlude and eliminate lithium metal or lithium ion, for example. This carbon material is prepared at a predetermined temperature and in a predetermined atmosphere. Examples of the carbon materials are heat decomposition carbon, coke such as petroleum coke or pitch coke, artificial graphites, natural graphites, carbon black such as acetylene black, glass-like carbon, an organic polymer-material calcine, or a carbon fiber. The organic polymer-material calcine is obtained by calcinating an organic polymer material at an appropriate temperature of 500° C. or above in an inactive gas atmosphere or in a vacuum.

The positive electrode 12 contains, for example, the metal sulfide or the oxide, which does not contain lithium, such as $TiS_2$, $MoS_2$, $NbSe_2$, or $V_2O_5$, or a lithium compound oxide containing lithium, as a positive electrode active material. In particular, in order to increase energy density, it is desirable that the positive electrode 12 include the lithium compound oxide which contains mainly $Li_x MO_2$, wherein M is one or more kinds of transition metals, preferably, at least one among cobalt (Co), nickel (Ni), and manganese (Mn), and where x is usually a value within the range of $0.05 \leq x \leq 1.10$. Examples of the lithium compound oxides are $LiCoO_2$, $LiNiO_2$, $Li_x Ni_y Co_{1-y} O_2$ wherein x and y usually vary in the range of $0<x<1$ and $0.7<y \leq 1$ respectively depending on the electric-charge and discharge state of a battery, and $LiMn_2 O_4$.

The lithium compound oxide is prepared in the following way: carbonic acid salt, a nitrate, an oxide or hydroxide of lithium, and carbonic acid salt, a nitrate, an oxide or hydroxide of a transition metal are pulverized and mixed according to desired composition and calcinated in an oxygen atmosphere at the temperature within the range of 600 to 1000° C.

The electrolyte 13 contains lithium salt as light metal salt. In addition, the electrolyte 13 also serves as a separator in this secondary battery. That is, the negative electrode 11 and the positive electrode 12 are isolated by the electrolyte 13 so that lithium ions are passed through the electrolyte 13 while the short of current caused by the contact of two poles is prevented. In addition, a separator, not shown, may be provided between the negative electrode 11 and the electrolyte 13, between the positive electrode 12 and the electrolyte 13, or into electrolyte 13 if needed. Among the materials which are useful as a separator are a material which consists of a nonwoven fabric made from synthetic resins such as polytetrafluoroethylene, polypropylene, or polyethylene, a material which consists of a ceramic film, and a material which consists of a porous thin film.

The secondary battery with the structure described above acts as follows.

When the secondary battery is charged, lithium contained in the positive electrode 12 is dissociated as ions, and occluded to the alloy or the carbon material contained in the negative electrode 11 through the electrolyte 13. Then, if the secondary battery is discharged, the lithium which has been occluded to the alloy or the carbon material contained in the negative electrode 11 is dissociated as ions and the ions return to the positive electrode 12 through the electrolyte 13 and are occluded to the positive electrode 12. In the electrolyte 13, the first and the second polymer compounds form a semi-interpenetrating polymer network. Therefore, the molecular movement in the second polymer compound is not suppressed, and crystallization is prevented. As a result, the electrolyte 13 achieves higher ion conductivity than the ion conductivity achieved by using either the first or the second polymer compound separately, in the wide range of the temperature. Moreover, the electrolyte 13 contains the first polymer compound. This contributes to the high mechanical intensity of the electrolyte 13. As a result, the electrolyte 13 is easily formed into a film with a great strength.

As described above, the electrolyte according to this embodiment includes two or more sorts of polymer compounds which form a semi-interpenetrating polymer network. The electrolyte according to this embodiment thus achieves higher ion conductivity than the ion conductivity achieved by using each polymer compound separately. The electrolyte according to this embodiment also has high mechanical intensity. Therefore, if an electrochemistry device is constructed using this electrolyte, the electrochemistry device with higher performance can be obtained easily.

Moreover, each of the polymer compounds may have an ether bond. In this case, it is possible to increase the compatibility of the polymer compounds and the dissolubility of light metal salt. As a result, the electrolyte can expect higher ion conductivity.

Furthermore, the electrolyte may include at least one sort of first polymer compound obtained by bridging compounds having bridge groups with the bridge groups. In this case, the semi-interpenetrating polymer network can be formed easily.

In addition, if the first polymer compound has open-end side chains containing ether bonds, light metal salt can be moved by the molecular movement of the open-end side chains of the first polymer compound. This contributes to even higher ion conductivity.

The compound for the electrolyte according to this embodiment includes bridgeable compounds having the bridgeable functional groups, and the second polymer compound, which forms a semi-interpenetrating polymer network with the first polymer compound obtained by bridging the bridgeable compounds with the bridge groups so that the second polymer compound achieves higher ion conductivity than the ion conductivity achieved by using either the first or the second polymer compound separately. Thus, the electrolyte according to this embodiment can be obtained easily by polymerizing the bridgeable compounds.

In addition, the compound for the electrolyte according to this embodiment includes two or more sorts of polymer compounds, which can form a semi-interpenetrating polymer network so that the polymer compounds achieve higher ion conductivity than the ion conductivity achieved by using each polymer compound separately. As a result, the electrolyte according to this embodiment can be obtained easily.

According to the process for producing the electrolyte according to this embodiment, the bridgeable compounds and the second polymer compound are mixed and the bridgeable compounds are polymerized. Therefore the electrolyte according to this embodiment can be obtained easily.

Furthermore, the secondary battery according to this embodiment utilizes two or more sorts of polymer compounds which form a semi-interpenetrating polymer network so that the polymer compounds achieves higher ion conductivity than the ion conductivity obtained by using each polymer compound separately. This contributes both to high mechanical intensity and to high ion conductivity. The secondary battery according to this embodiment is thus produced in an easy process and can expect high performance.

EXAMPLE

The following examples illustrate the formulation and use of the electrolytes according to the present invention further in detail, but do not serve to limit the scope of the present invention in any way.

Example 1

An electrolyte according to the present invention was prepared. To 50 parts of the acetonitrile ($CH_3CN$) as a solvent was added one part of the siloxane derivative corresponding to Chemical Formula (5):

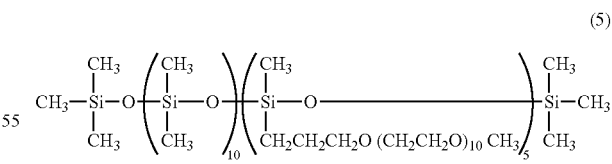

(5)

Meanwhile, to this siloxane derivative was added 1.0M (mol/l) lithiumbis(trifluoromethylsulfonyl)imide ($Li(CF_3SO_2)_2 N$) as light metal salt and dissolved therein. To this, then, were added two parts of polyethylene glycol dimethacrylate and two parts of the methoxy-polyethylene glycol monomethacrylate as bridgeable compounds. The mixture stirred until uniform.

The polyethylene glycol dimethacrylate corresponds to Chemical Formula (6):

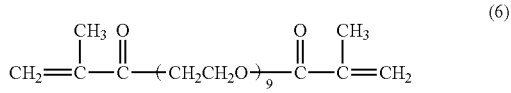

(6)

The methoxy-polyethylene glycol monomethacrylate corresponds to Chemical Formula (7):

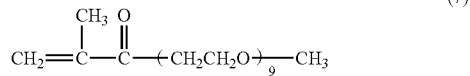

(7)

After the mixture had been kept at a temperature of 25° C. under a reduced pressure and acetonitrile had been removed from the mixture, was added 0.05 parts of 2,2-dimethoxy 2,2'-phenylacetophenone as a polymerization initiator and dissolved therein. Then, the mixture was applied uniformly to the substrate made of Teflon. After that, the ultraviolet ray was irradiated with 6 mW/cm² of luminous energy in the air at a temperature of 25° C. for 20 minutes for the polymerization reaction. Then, the mixture was dried at a temperature of 60° C. under a reduced pressure for six hours. The electrolyte produced took the form of a film 100 μm thick.

Example 2

An electrolyte was produced as in Example 1 but with 0.5 parts of the polyethylene glycoldimethacrylate corresponding to Chemical Formula (6) and 0.5 parts of the methoxy-polyethylene glycol monomethacrylate corresponding to Chemical Formula (7).

Example 3

An electrolyte was produced as in Example 1 but with 0.125 parts of the polyethylene glycol dimethacrylate corresponding to Chemical Formula (6) and 0.125 parts of the methoxy-polyethylene glycol monomethacrylate corresponding to Chemical Formula (7).

Example 4

An electrolyte was produced as in Example 1 but with 1.33 parts of the polyethylene glycoldimethacrylate corresponding to Chemical Formula (6) and 2.66 parts of the methoxy-polyethylene glycol monomethacrylate corresponding to Chemical Formula (7).

Example 5

An electrolyte was produced as in Example 1 but with 0.083 parts of the polyethylene glycol dimethacrylate corresponding to Chemical Formula (6) and 0.166 parts of the methoxy-polyethylene glycol monomethacrylate corresponding to Chemical Formula (7).

Comparative Example 1

A liquid electrolyte which consists of the second polymer compound and light metal salt was prepared. To 50 parts of the acetonitrile ($CH_3CN$) as a solvent was added one part of the siloxane derivative corresponding to Chemical Formula (5) as a second polymer compound. Meanwhile, to this siloxane derivative was added 1.0M(mol/l) lithiumbis (trifluoromethylsulfonyl) imide ($Li(CF_3SO_2)_2N$) as light metal salt and dissolved therein. Then, the mixture was dried at a temperature of 60° C. under a reduced pressure for six hours to remove acetonitrile.

Comparative Example 2

An electrolyte, which consists of a compound obtained by bridging bridgeable compounds in the bridge groups (namely, a first polymer compound) and light metal salt, was prepared. To 50 parts of the acetonitrile ($CH_3CN$) as a solvent were added two parts of the polyethylene glycol dimethacrylate corresponding to Chemical Formula (6) and two parts of the methoxy polyethylene glycol monomethacrylate corresponding to Chemical Formula (7) as bridgeable compounds. Meanwhile, to this mixture was added 1.0M(mol/l) lithium-bis(trifluoromethylsulfonyl) imide ($Li(CF_3SO_2)_2N$) as light metal salt and dissolved therein. After the mixture had been kept at a temperature of 25° C. under a reduced pressure and acetonitrile had been removed from the mixture, was added 0.05 parts of 2,2-dimethoxy-2,2'-phenyl acetophenone as a polymerization initiator and dissolved therein. Then the mixture was applied uniformly to the substrate made of Teflon. After that, the ultraviolet ray was irradiated by 6 mW/cm² of luminous energy in the air at a temperature of 25° C. for 20 minutes for the polymerization reaction. Then, the mixture was dried at a temperature of 60° C. under reduced pressure for six hours. The electrolyte produced took the from of a film 100 μm thick.

Table 1 summarizes the ion conductivity of the electrolytes prepared in Examples 1 to 5 and Comparative Example 1 and 2. As for the electrolytes prepared in Examples 1 to 5 and Comparative Example 2, the films of the electrolytes were clipped into the shape of a disk with the area of 0.7854 cm². Each electrolyte disk was sandwiched between a pair of electrodes made of stainless steel. Ion conductivity was measured by the alternating-current impedance method. As for the liquid electrolyte prepared in Comparative Example 1, the electrolyte was sandwiched between plates made of stainless steel with the area of 0.7854 cm² with a spacer 100 μm thick and made of polypropylene. Ion conductivity was measured as in the other Examples.

TABLE 1

|  | Ion conductivity (25° C.) (mS/cm) |
| --- | --- |
| Example 1 | 0.15 |
| 2 | 0.22 |
| 3 | 0.43 |
| 4 | 0.23 |
| 5 | 0.51 |
| Comparative example 1 | 0.17 |
| 2 | $3.2 \times 10^{-2}$ |

Table 1 shows that the electrolytes prepared in Example 1 to 5 all achieve the ion conductivity of $1 \times 10^{-5}$ S/cm or more and have sufficient ion conductivity for a battery. In addition, table 1 also shows that the ion conductivity achieved by the electrolytes of Examples 1 to 5 is higher than the ion conductivity achieved by the electrolytes of Comparative Examples 1 and 2. In other words, it is understood that the electrolytes of Examples 1 to 5, which include the first and the second polymer compounds that form a semi-interpenetrating polymer network, exhibit higher ion conductivity than the ion conductivity achieved by using either the first or the second polymer compound separately.

Therefore, it is understood that an electrolyte which contains the first polymer compound, second polymer compound and light metal salt achieves high ion conductivity, and that a battery using this electrolyte has the outstanding performance.

Although the invention has been described in its preferred embodiments and examples, this invention is not limited to the above-described embodiments and examples, and many changes and modifications are possible. For example, in the above-mentioned embodiment, the first polymer compound obtained by bridging bridgeable compounds with the bridge groups, and the second polymer compound that does not have bridgeable functional groups, and dissolves light metal salt are utilized as two or more sorts of polymer compounds which form a semi-interpenetrating polymer network. However, as long as it can form a semi-interpenetrating polymer network, other polymer compounds may be utilized.

Moreover, in the above-mentioned embodiment, substantially no chemical bond is formed between the first polymer compound and the second polymer compound. However, chemical bonds, such as bridge, may be formed between part of two or more sorts of polymer compounds that form a semi-interpenetrating polymer network. In order to increase ion conductivity, preferably, fewer chemical bonds are formed between them, and an ideal semi-interpenetrating polymer network is formed.

In the above-mentioned embodiment and examples, the compounds obtained by bridging the diester compounds or the monochrome ester compounds with the bridge groups as the first polymer compound. However, examples of the first polymer compound include compounds with other structures.

In addition, in the above-mentioned embodiment and examples, the siloxane derivative has been explained as the second polymer compound. However, examples of the second polymer compound include compounds with other structures.

Also, in the above-mentioned embodiment, the second polymer compound does not have bridgeable functional groups and dissolves light metal salt. However, any polymer compound can be used as the second polymer compound as long as the polymer compound and the first polymer compound obtained by bridging bridgeable compounds with the bridge groups form a semi-interpenetrating polymer network and thereby achieve higher ion conductivity than the ion conductivity achieved by using either the polymer compound or the first polymer compound separately.

In addition, in the above-mentioned embodiment, the first and the second polymer compounds were described as the examples of two or more sorts of polymer compounds which form a semi-interpenetrating polymer network. However, any polymer compounds may be used, as long as the polymer compounds form a semi-interpenetrating polymer network.

Furthermore, the secondary battery using lithium has been explained in the above-mentioned embodiment and a case where lithium salt is used as light metal salt has been described in the above-mentioned examples. However, the present invention can be similarly applied to an electrolyte and a secondary battery which use other light metal salt, such as sodium salt or calcium salt.

In addition, although the paper type secondary battery has been explained in the above-mentioned embodiment, the present invention is applied with equal utility to a secondary battery with other forms, such as a button type, a coin model, a square type, and the pipe type which has a spiral structure.

While the electrolyte of this invention has been used for a secondary battery in the above-mentioned embodiment, the electrolyte and the compound for the electrolyte of this invention can be used for other batteries, such as a primary battery. The electrolyte and the compound for the electrolyte of this invention can also be used for other electrochemistry devices, such as a capacitor and an electrochromic element.

As explained above, according to the compound for the electrolyte of the present invention, the compound for the electrolyte includes two or more sorts of polymer compounds which form a semi-interpenetrating polymer network so that the polymer compounds achieve higher ion conductivity than the ion conductivity achieved by using each polymer compound separately. Therefore, the electrolyte with higher ion conductivity can be obtained easily.

In addition, according to the compound for the electrolyte of one aspect of the present invention, each polymer compound has an ether bond or a polyoxyalkylene structure. This increases the compatibility of the polymer compounds and the semi-interpenetrating polymer network can be formed easily.

Furthermore, according to the compound for the electrolyte of one aspect of the present invention, the compound for the electrolyte includes bridgeable compounds having bridgeable functional groups, and the second polymer compound. The second polymer compound and the first polymer compound obtained by bridging the bridgeable compounds with the bridgeable groups can form a semi-interpenetrating polymer network so that the second polymer compound achieves higher ion conductivity than the ion conductivity achieved by using each polymer compound separately. Therefore, the electrolyte with higher ion conductivity can be obtained easily by polymerizing the bridgeable compounds.

According to the electrolyte of the present invention, the electrolyte includes two or more sorts of polymer compounds which form a semi-interpenetrating polymer network so that the polymer compounds achieve higher ion conductivity than the ion conductivity achieved by using each polymer compound separately. Therefore, the electrolyte of the present invention achieves both high mechanical intensity and high ion conductivity. Thus, if an electrochemistry device is produced using this electrolyte, the electrochemistry device with the high performance can be obtained easily.

According to the electrolyte of one aspect of the present invention, each polymer compounds has an ether bond or a polyoxyalkylene structure. This increases the compatibility of the polymer compounds and the dissolubility of light metal salt. As a result, the electrolyte can expect higher ion conductivity.

According to the electrolyte of one aspect of the present invention, the electrolyte includes at least one sort of first polymer compound obtained by bridging bridgeable compounds with the bridge groups, a semi-interpenetrating polymer network can be formed easily.

According to the process for producing the electrolyte of the present invention, the bridgeable compounds and the second polymer compound are mixed, and then the bridgeable compounds are polymerized. Therefore, the electrolyte of the present invention can be obtained easily.

According to the battery of the present invention, the battery uses the electrolyte containing two or more sorts of polymer compounds which form a semi-interpenetrating polymer network so that the polymer compounds achieve higher ion electric conductivity than the ion conductivity achieved by using each polymer compounds separately. This contributes both to high mechanical intensity and to high ion conductivity. Therefore, the battery with the high performance can be produced in an easy process.

Obviously many modifications and variations of the present invention are possible in the light of the above teachings. It is therefore to be understood that within the scope of the appended claims the invention may be practiced otherwise than as specifically described.

What is claimed is:

1. An electrolyte compound comprising:
   at least one first polymer compound having at least one bridgeable functional group bridged with at least one bridge group; and
   at least one second polymer compound of an open-chain siloxane derivative without bridgeable functional groups having an open-chain bond between silicon and oxygen as a basic frame and corresponding to the formula $(SiOCH_3R)_n$;
   wherein R is a monovalent organic group and added to the silicon; and
   wherein said first polymer compound and said second polymer compound combine to form a semi-interpenetrating polymer network wherein substantially no chemical bond is formed between said first polymer compound and said second polymer compound.

2. An electrolyte compound according to claim 1, wherein said first polymer compound and said second polymer compound separately comprise an ether bond.

3. An electrolyte compound according to claim 1, wherein said first polymer compound and said second polymer compound separately comprise a polyoxyalkylene structure.

4. An electrolyte compound according to claim 1 wherein 10 to 1000 parts by weight of the first polymer compound and 5 to 1000 parts by weight of a light metal salt are used for 100 parts by weight of said siloxane derivative.

5. An electrolyte comprising:
   at least one first polymer compound having at least one bridgeable functional group bridged with at least one bridge group;
   at least one second polymer compound of an open-chain siloxane derivative without bridgeable functional groups having an open-chain bond between silicon and oxygen as a basic frame and corresponding to the formula $(SiOCH_3R)_n$ wherein R is a monovalent organic group and added to the silicon; and
   a light metal salt;
   wherein said first polymer compound and said second polymer compound form a semi-interpenetrating polymer network wherein substantially no chemical bond is formed between said first polymer compound and said second polymer compound.

6. An electrolyte according to claim 5, wherein said first polymer compound and said second polymer compound separately comprise an ether bond.

7. An electrolyte according to claim 5, wherein said first polymer compound and said second polymer compound separately comprise a polyoxyalkylene structure.

8. An electrolyte according to claim 5, wherein 10 to 1000 parts by weight of said first polymer and 5 to 1000 parts by weight of said light metal salt are used for 100 parts by weight of said siloxane derivative.

9. A process for producing an electrolyte comprising the steps of:
   mixing at least one first polymer compound having at least one bridgeable functional group, at least one second polymer compound of an open-chain siloxane derivative without bridgeable functional groups having an open-chain bond between silicon and oxygen as a basic frame and corresponding to the formula $(SiOCH_3R)_n$ wherein R is a monovalent organic group and added to the silicon, and a light metal salt; and
   polymerizing said first polymer compound with at least one bridge group thereby bridging said bridgeable functional group;
   wherein said first polymer compound and said second polymer compound combine to form a semi-interpenetrating polymer network wherein substantially no chemical bond is formed between said first polymer compound and said second polymer compound.

10. A process for producing an electrolyte comprising the steps of:
    mixing at least one first polymer compound having at least one bridgeable functional group and a second polymer compound of an open-chain siloxane derivative without bridgeable functional groups having an open-chain bond between silicon and oxygen as a basic frame and corresponding to the formula $(SiOCH_3R)_n$ wherein R is a monovalent organic group and added to the silicon;
    polymerizing said first polymer compounds with at least one bridge group thereby bridging said bridgeable functional group; and
    adding a light metal salt to the mixture;
    wherein said first polymer compound and said second polymer compound combine to form a semi-interpenetrating polymer network wherein substantially no chemical bond is formed between said first polymer compound and said second polymer compound.

11. A battery comprising:
    a positive electrode;
    a negative electrode; and
    an electrolyte including at least one first polymer compound having at least one bridgeable functional group bridged with at least one bridge group, and at least one second polymer of an open-chain siloxane derivative without bridgeable functional groups having an open-chain bond between silicon and oxygen as a basic frame and corresponding to the formula $(SiOCH_3R)_n$ wherein R is a monovalent organic group and added to the silicon;
    wherein said first compound and said second compound combine to form a semi-interpenetrating polymer network wherein substantially no chemical bond is formed between said first polymer compound and said second polymer compound.

12. A battery according to claim 11, wherein said first polymer compound and said second polymer compound separately comprise an ether bond.

13. A battery according to claim 11, wherein said first polymer compound and said second polymer compound separately comprise a polyoxyalkylene structure.

14. A battery according to claim 11, wherein 10 to 1000 parts by weight of said first polymer and 5 to 1000 parts by weight of said light metal salt are used for 100 parts by weight of said siloxane derivative.

15. An electrolyte according to claim 5 wherein said at least one first polymer compound is selected from the group consisting of polyoxyalkylene, diester compounds, and mixtures thereof.

16. The electrolyte of claim 15 wherein said first polymer compound comprises a diester compound having the following structure (I):

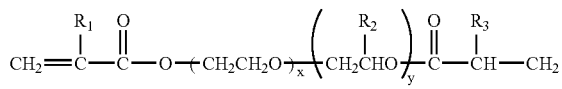

wherein $R_1$, $R_2$, and $R_3$ are separately selected from the group consisting of a hydrogen atom, an alkyl of carbon numbers 1–6, and mixtures thereof; and wherein $x \geq 1$ and $y \geq 0$ or $x \geq 0$ and $y \geq 1$.

17. The electrolyte of claim 16 wherein said first polymer compound further comprises a monochrome ester compound having the following structure (II):

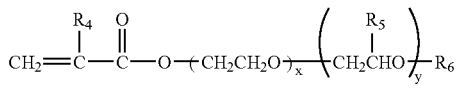

wherein $R_4$, $R_5$, and $R_6$ are separately selected from the group consisting of a hydrogen atom, an alkyl of carbon numbers 1–6, and mixtures thereof; and wherein $x \geq 1$ and $y \geq 0$ or $x \geq 0$ and $y \geq 1$.

18. The electrolyte of claim 16 wherein the ratio (x) of diester compound to monochrome ester compound $0 < x \leq 5$.

19. The electrolyte of claim 15 wherein said bridge group is selected from the group consisting of ether bonds, ester bonds, urethane bonds, and mixtures thereof.

20. The electrolyte of claim 15 wherein said second polymer compound comprises an open-chain siloxane derivative having an open-chain bond between silicon and oxygen as a basic frame, said compound having the formula $(SiOCH_3R)_n$ wherein R is a side chain selected from the group consisting of an ethoxy, a propoxy, a butoxy, and a methoxy group.

21. The electrolyte of claim 20 wherein said second polymer compound has a molecular weight of 100,000 daltons or less.

22. The electrolyte of claim 20 wherein hydrogen in R is replaced by a halogen element.

23. The electrolyte of claim 15 wherein said second polymer compounds comprises a siloxane derivative having the following structure (III):

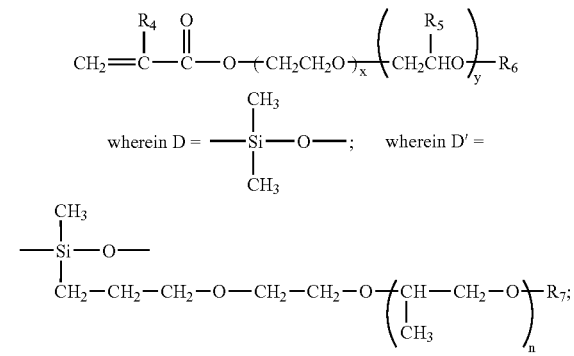

$$-Si-O-$$
$$CH_2-CH_2-CH_2-O-CH_2-CH_2-O-\left(\begin{array}{c}CH-CH_2-O\\|\\CH_3\end{array}\right)_n R_7;$$

and wherein a is an integer of 0–100, b is an integer of 1–100, m is an integer of 0–100, n is an integer of 0–100, and $R_7$ is selected from the group consisting of a hydrogen atom, an alkyl, or mixtures thereof.

24. The electrolyte of claim 15 wherein said light metal salt has the formula AB wherein A is a light metal cation and B is an onion.

25. The electrolyte of claim 24 wherein said light metal cation is selected from the group consisting of lithium salt, sodium salt, potassium salt, calcium salt and magnesium salt.

26. The electrolyte of claim 24 wherein said light metal salt is selected from the group consisting of $LiClO_4$, $LiBF_4$, $LiPF_6$, $LiAsF_6$, $LiAlCl_4$, $LiSbF_6$, $LiCF_3SO_3$, $LiN(CF_3SO_2)_2$, $LiC_4F_9SO_3$, $LiCF_3CO_2$, $LiN(CF_3CO_2)$, $NaClO_4$, $NaBF_4$, $NaSCN$, $KBF_4$, and mixtures thereof.

* * * * *